US006972499B2

(12) United States Patent
Emoto

(10) Patent No.: US 6,972,499 B2
(45) Date of Patent: Dec. 6, 2005

(54) LINEAR MOTOR, STAGE APPARATUS, EXPOSURE APPARATUS, AND DEVICE MANUFACTURING METHOD

(75) Inventor: Keiji Emoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/068,841

(22) Filed: Feb. 11, 2002

(65) Prior Publication Data

US 2002/0113498 A1 Aug. 22, 2002

(30) Foreign Application Priority Data

Feb. 16, 2000 (JP) ....................................... 2001-040170

(51) Int. Cl.[7] ................................................ H02K 41/00
(52) U.S. Cl. ......................................................... 310/12
(58) Field of Search ............................................ 310/12

(56) References Cited

U.S. PATENT DOCUMENTS

| | | | | | |
|---|---|---|---|---|---|
| 4,492,356 | A | * | 1/1985 | Taniguchi et al. | 248/346.06 |
| 5,153,472 | A | * | 10/1992 | Karidis | 310/13 |
| 5,179,304 | A | | 1/1993 | Kenjo et al. | 310/12 |
| 5,770,899 | A | * | 6/1998 | Hayashi | 310/12 |
| 5,877,505 | A | | 3/1999 | Fujino | 250/491.1 |
| 5,998,889 | A | | 12/1999 | Novak | 310/12 |
| 6,012,697 | A | * | 1/2000 | Ohtomo et al. | 248/476 |
| 6,084,319 | A | * | 7/2000 | Kamata | 310/12 |
| 6,107,703 | A | * | 8/2000 | Korenaga | 310/12 |
| 6,114,781 | A | | 9/2000 | Hazelton et al. | 310/12 |
| 6,130,490 | A | * | 10/2000 | Lee | 310/12 |
| 6,184,596 | B1 | * | 2/2001 | Ohzeki | 310/12 |
| 6,307,619 | B1 | * | 10/2001 | Gaalburt | 355/53 |
| 6,417,914 | B1 | * | 7/2002 | Li | 355/75 |
| 6,451,130 | B1 | * | 9/2002 | Chung et al. | 148/286 |
| 6,646,233 | B2 | * | 11/2003 | Kanno et al. | 219/390 |
| 6,677,692 | B1 | * | 1/2004 | Sato et al. | 310/89 |
| 6,824,277 | B2 | * | 11/2004 | Freitag et al. | 359/507 |

FOREIGN PATENT DOCUMENTS

| | | | | |
|---|---|---|---|---|
| JP | 302747 | * of 1995 | H01L/21/027 |
| JP | 2001-025227 | * of 2001 | H02K/41/02 |
| JP | 2001-025277 | 1/2001 | |

OTHER PUBLICATIONS

European Search Report dated Mar. 17, 2004, issued in corresponding European patent appln. No. 02 25 1037, forwarded in a Communication dated Mar. 25, 2004.

* cited by examiner

*Primary Examiner*—Darren Schuberg
*Assistant Examiner*—Judson H. Jones
(74) *Attorney, Agent, or Firm*—Fitzpatrick, Cella, Harper & Scinto

(57) ABSTRACT

Outflow of heat generated by a linear motor to the outside is suppressed. A linear motor according to the present invention is a linear motor used in a vacuum atmosphere, including a stator, a movable element movable relative to the stator, and a metal film formed on the surface of at least one of the stator and the movable element. This decreases the emissivity and reduces the outflow of heat by radiation from the linear motor.

11 Claims, 11 Drawing Sheets

SEMICONDUCTOR DEVICE MANUFACTURING FLOW

WAFER PROCESS

LINEAR MOTOR, STAGE APPARATUS, EXPOSURE APPARATUS, AND DEVICE MANUFACTURING METHOD

FIELD OF THE INVENTION

The present invention relates to a linear motor suitable for use in a reduced-pressure atmosphere, a stage apparatus suitable for use in a vacuum atmosphere, an exposure apparatus such as an electron beam exposure apparatus, and a device manufacturing method.

BACKGROUND OF THE INVENTION

Conventionally, the structure of a linear motor used in a vacuum atmosphere is basically identical to that of a linear motor used in an atmospheric atmosphere.

The linear motor has a stator and movable element. The stator has a plurality of coils and a jacket which covers the coils and in which a refrigerant is supplied to cool the coils. When a current flows to the coils, the movable element moves relative to the stator. When the current flows to the coils, the coils generate heat. The heat is recovered by the temperature-controlled refrigerant flowing in the jacket.

In a conventional linear motor, the surface of the magnet of the movable element is coated with an epoxy resin for rust prevention. The jacket of the stator is made of a PEEK material or ceramic material to prevent an eddy current from being generated when the stator moves relative to the magnet of the movable element.

When the linear motor is used in a vacuum atmosphere as in a case wherein the linear motor is used by an electron beam exposure apparatus, the following technical problems arise.

(1) When heat enters a structure making up the linear motor or a structure around the linear motor, in the atmospheric pressure, the heat is released to the air, whereas in the vacuum atmosphere, the heat is released by only radiation. Accordingly, in the vacuum atmosphere, the temperature rise of the structure becomes larger than that in the atmospheric atmosphere. Consequently, the structure that receives heat tends to thermally deform. For example, when this linear motor is used by a precision positioning apparatus used in the vacuum atmosphere, the deformation of the structure caused by the temperature change causes deformation of a position measuring mirror or the like, leading to degradation in positioning precision.

(2) In the conventional linear motor, the jacket of the stator is made of a resin material or ceramic material. In particular, when the jacket is made of a ceramic material, it is difficult to degrease it. If fats and fatty oils attach to the jacket during machining or assembling the linear motor, the degreasing process is difficult. In the vacuum atmosphere, the water or oil content must be avoided from attaching to the structure in view of degassing. Therefore, in the linear motor used in the vacuum atmosphere, degassing of the fats and fatty oils attaching to it becomes an issue. Also, close attention must be paid so the fats and fatty oils or the like do not attach to the linear motor during machining or assembling.

(3) Furthermore, when the refrigerant for recovering the generated heat is supplied inside the jacket, for example, if a refrigerant such as a fluorine-based inert refrigerant with high insulating properties is used, static electricity is generated by friction of the refrigerant and jacket, and the jacket tends to be electrically charged easily. In an electron beam exposure apparatus that uses a linear motor in the vacuum atmosphere, when the structure of the jacket or the like is electrically charged, the charges influence exposure. For this reason, electric charges of the structure must be reduced.

SUMMARY OF THE INVENTION

It is an object of the present invention to improve any of the above problems.

According to the present invention, there is provided a linear motor suitable for use in a reduced-pressure atmosphere, comprising a stator, a movable element movable relative to the stator, and a metal film formed on a surface of at least one of the stator and the movable element.

According to a preferred embodiment of the present invention, the stator preferably has a coil, and the movable element preferably has a magnet. The coil is preferably covered with a jacket. The jacket preferably forms a flow path for supplying a refrigerant that cools the coil. The metal film is preferably formed on a surface of the jacket.

According to a preferred embodiment of the present invention, the metal film is preferably formed on a surface of at least the stator. In this case, the metal film formed on the surface of the stator is preferably formed at least at a portion thereof which opposes the movable element.

Alternatively, the metal film is preferably formed on a surface of the movable element. In this case, the metal film formed on the surface of the movable element is preferably formed at least at a portion thereof which opposes the stator.

According to a preferred embodiment of the present invention, the metal film is preferably formed of a nonmagnetic material. The metal film preferably contains nickel or gold. The metal film preferably has a thickness of 10 $\mu$m to 30 $\mu$m.

According to a preferred embodiment of the present invention, the metal film is desirably formed by plating.

According to a preferred embodiment of the present invention, the metal film has been preferably subjected to mirror polishing.

According to a preferred embodiment of the present invention, the metal film is preferably grounded.

According to the present invention, there is provided a stage apparatus comprising the above linear motor and a movable stage integrally formed with the movable element of the linear motor.

According to the present invention, there is provided a stage apparatus comprising the above linear motor, a stage moved by the linear motor, a chamber surrounding and hermetically sealing the stage, and a vacuum mechanism for evacuating the chamber.

According to the present invention, there is provided an exposure apparatus having the above stage apparatus as a substrate stage for positioning a substrate such as a wafer, and/or as a stage for positioning an original plate such as a reticle. In this case, for example, the exposure apparatus is preferably an electron beam exposure apparatus.

According to the present invention, there is provided a device manufacturing method comprising the steps of preparing the above exposure apparatus, applying a photosensitive agent to a substrate, exposing the substrate by using the exposure apparatus, and developing the exposed substrate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

In a positioning apparatus for highly precise positioning, the heat generating source is mainly the coil of a linear motor serving as a driving mechanism. When the linear motor is used in an ordinary atmospheric atmosphere, most of the quantity of heat generated by the coil is recovered by a refrigerant flowing inside the jacket. Some unrecovered quantity of heat increases the temperature of the jacket and causes subsequent heat transfer to the air and heat radiation. Thus, the equilibrium state is maintained.

When the linear motor is used in the vacuum atmosphere, heat does not transfer to the air, so the temperature rise of the jacket increases. Regarding other structures, similarly, heat does not transfer to the air. Hence, if heat enters for some reason, a temperature rise tends to occur. When the temperature of the structure increases, it causes thermal deformation of the structure, and the relationship between structures relative to each other changes. Consequently, the positioning precision of the positioning apparatus is degraded.

For this reason, in the vacuum atmosphere, an arrangement that suppresses the in-flow rate of heat flow to the structure is desirable more than in the arrangement in the atmospheric atmosphere.

According to the embodiments of the present invention, transfer of heat generated by the linear motor as one heat generating source in the positioning apparatus is suppressed. In the linear motor, the stator and movable element do not come into contact with each other. Thus, in the vacuum atmosphere, only heat flow caused by radiation need be considered.

The quantity of heat flow caused by radiation is related to the absolute temperatures and emissivities of structures A and B. The smaller the emissivities, the smaller the quantity of heat flow caused by the radiation of the structures A and B. The emissivity is a physical value determined by the material of the surface and the state of the surface. Generally, the emissivities of most of nonmetals such as a ceramic material are 0.8 or more at room temperatures, whereas the emissivity of a metal such as copper is as very small as 0.03 or less. Generally, the emissivity is small in a good conductor. Accordingly, silver, gold, and copper have smaller emissivities than other materials. The smaller the surface, the smaller the emissivity tends to be. Therefore, if the surface is a polished surface, the emissivity can be further decreased.

The practical arrangement of the present invention will be described in detail.

[First Embodiment]

Figure 6:
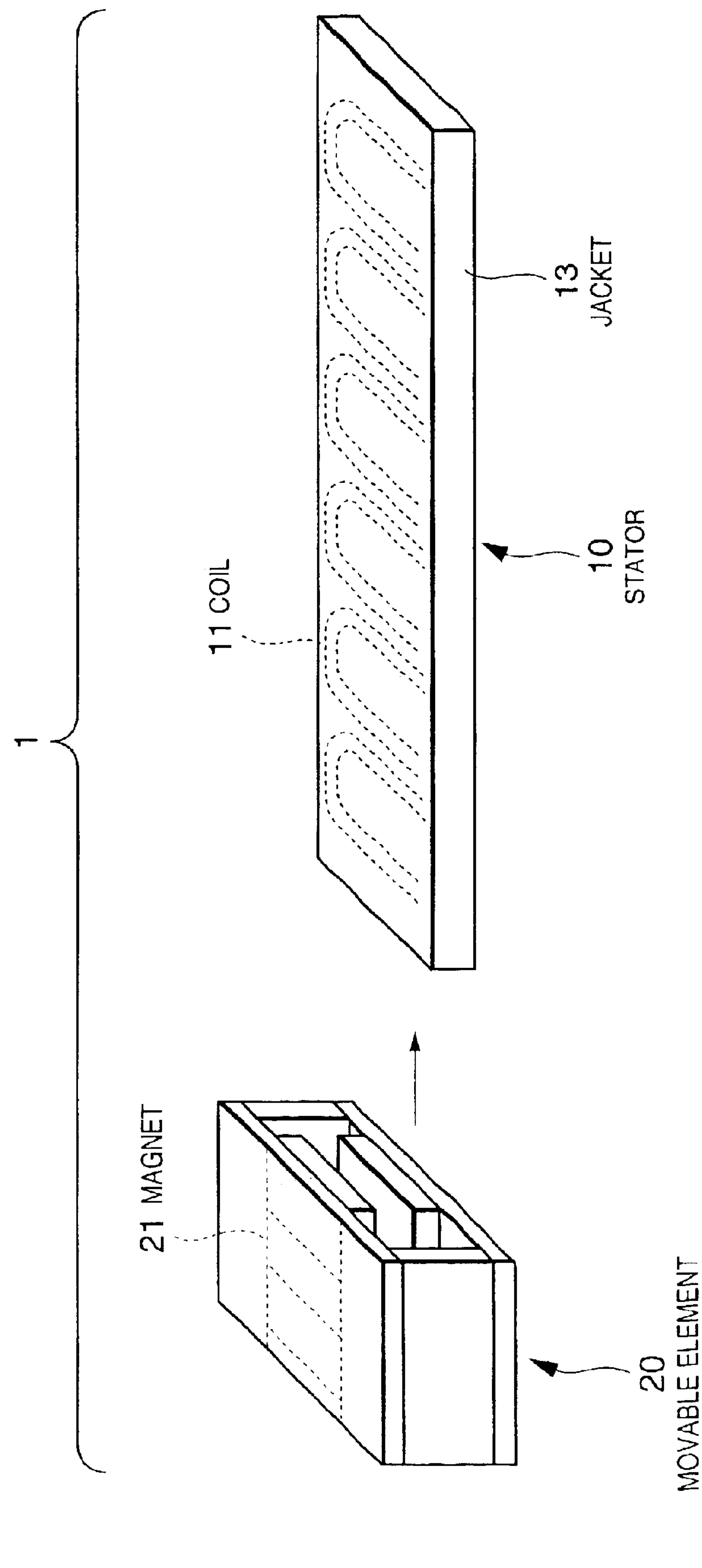
FIG. 6 is a schematic view of the linear motor according to the first embodiment.

FIG. 6 is a schematic view of a linear motor according to the first embodiment.

Referring to FIG. 6, the linear motor is used in a vacuum atmosphere. The "vacuum atmosphere" does not require a strict vacuum but suffices as far as it is a reduced-pressure atmosphere with a sufficiently low pressure.

Referring to FIG. 6, a linear motor 1 has a stator 10 and movable element 20. The stator 10 has a plurality of coils 11 arrayed in the moving direction of the movable element 20, and a jacket 13 which covers the coils 11 and in which a refrigerant is supplied to cool the coils 11. The movable element 20 has a plurality of magnets 21 arranged to sandwich the coils 11 of the stator 10. When a current flows to the coils 11, the Lorentz force is generated, and the movable element 20 moves to the left or right on the surface of the drawing relative to the stator 10. The movable element 20 is formed integrally with a stage (not shown). A target (not shown) is mounted on the stage, and is positioned by the linear motor 1.

Figure 1:
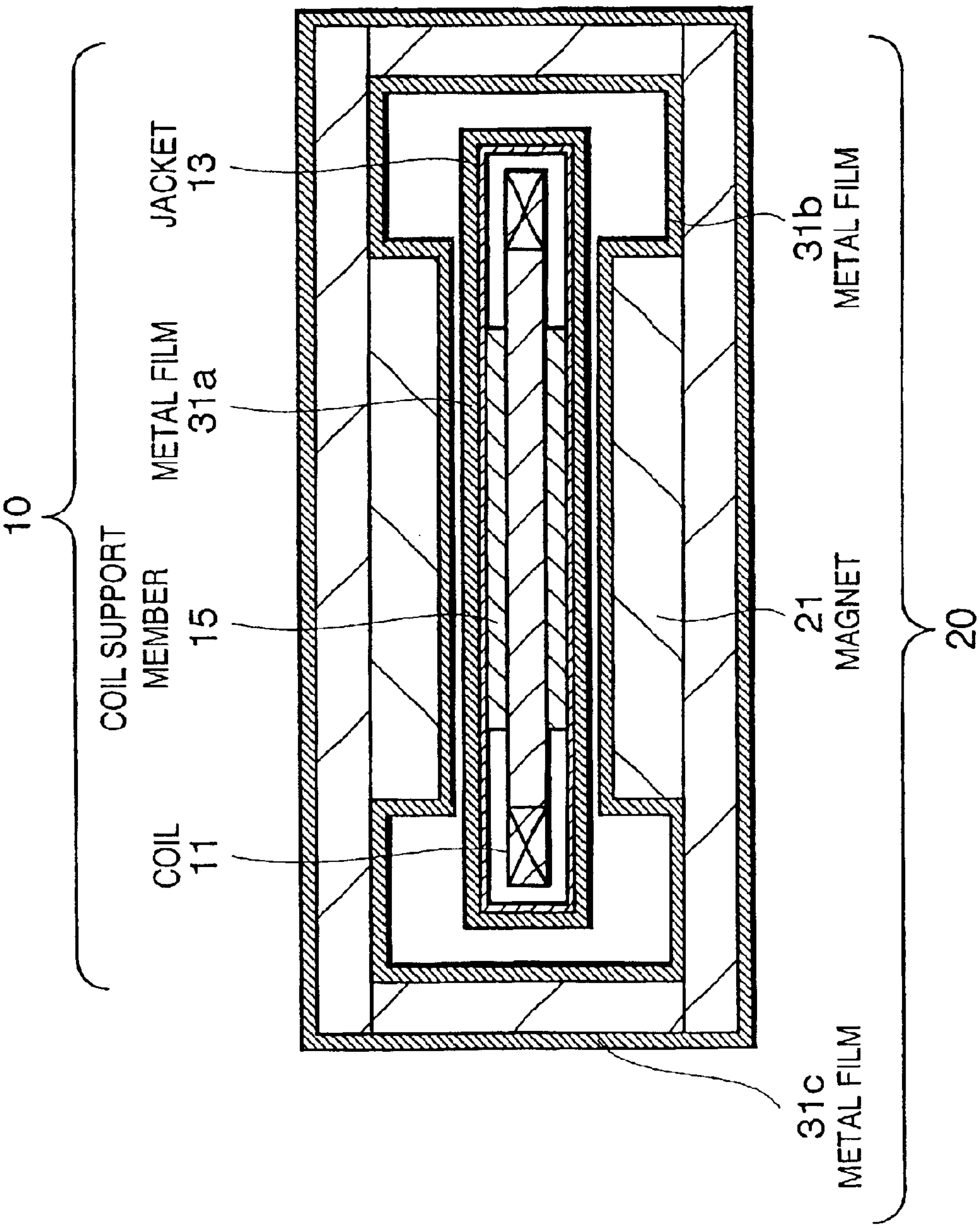
FIG. 1 is a sectional view of a linear motor according to the first embodiment seen from its moving direction.

FIG. 1 is a sectional view of the linear motor 1 according to the first embodiment seen from its moving direction.

Referring to FIG. 1, the stator 10 has the plurality of coils 11 (only some of the coils are shown in FIG. 1), and the jacket 13 which covers the coils 11 and in which a refrigerant is supplied to cool the coils 11. The coils 11 are held in the jacket 13 by a coil support member 15. The coil support member 15 supports the coils 11 and also serves as a jacket reinforcing member against the pressure of the refrigerant flowing inside the jacket 13. When a current flows to the coils 11, the coils 11 generate heat. The heat is recovered by the temperature-controlled refrigerant flowing inside the jacket 13.

The movable element 20 has the magnets 21 arranged to sandwich the coils 11 of the stator 10. When the current flows to the coils 11, the Lorentz force is generated, and the movable element 20 moves in a direction perpendicular to the surface of the drawing relative to the stator 10.

In this embodiment, metal films with small emissivities are added to the structure in order to suppress the flow of heat from the stator with the coils serving as a heat generating source to the movable element. Reference numeral 31*a* denotes a metal film formed on the surface of the jacket 13 of the stator 10. The metal film 31*a* is formed at least on that surface of the jacket 13 which opposes the magnets 21 of the movable element 20. Reference numeral 31*b* is a metal film formed on the inner surface of the movable element 20. The metal film 31*b* is formed on at least those surfaces of the magnets 21 which oppose the coils 11. Reference numeral 31*c* denotes a metal film formed on the outer surface of the movable element 20. The main body of the jacket 13 of the stator 10 is made of a ceramic material.

According to this embodiment, nickel metal films formed by nickel plating are used as an example of the metal films. The plating surfaces of the metal films formed by plating are further subjected to mirror polishing to decrease the surface emissivities. This decreases the emissivities of the stator 10 and movable element 20 to about 0.045. In this manner, according to this embodiment, metal films are formed on the surfaces of the structure, and the surfaces of the metal films are subjected to mirror polishing to smooth them, thereby decreasing the emissivities of the stator 10 and movable element 20. As a result, the flow of heat from the stator 10 with the coils 11 to the movable element 20 can be suppressed.

As described above, in this embodiment, the nickel metal films are used. Since nickel is nonmagnetic, it does not adversely affect a magnetic circuit between the coils 11 of the stator 10 and the magnets 21 of the movable element 20. Nickel plating can be performed at a low cost. However, the metal films are not limited to nickel films. Any other nonmagnetic material can be used to form the metal films as far as it can decrease the emissivities. Gold may be used to form the metal films. If gold plating is performed and the plating surfaces are further subjected to mirror polishing, the emissivities can be decreased to 0.01 or less, so the quantity of the flow of heat by radiation can be remarkably reduced.

The metal film 31*a* formed on the jacket 13 can generate an eddy current when it moves relative to the magnets 21. To suppress the eddy current, the thickness of the metal film 31*a* may be decreased. For this purpose, according to this embodiment, the thickness of the metal film is set to 10 $\mu$m to 30 $\mu$m. Plating is suitable as it can greatly reduce the thickness of the metal films 31*a* and 31*b*. To form the metal film, for example, plating is performed to a thickness of 50 $\mu$m or more, and after that mirror polishing is performed, so the metal film has a thickness of 10 $\mu$m to 30 $\mu$m.

According to this embodiment, the magnets 21 of the movable element 20 are originally made of a metal. Particularly those surfaces of the magnets 21 which oppose the jacket 13 are plated to form the metal film 31*b*, thereby obtaining a rustproof effect for the magnets 21. As the rust proof treatment for the magnets 21, the magnets 21 may be coated with a resin. The resin generally has a large degassing quantity. Therefore, in the vacuum atmosphere, to obtain an effect of decreasing the emissivity, which has been described so far, and an effect of reducing degassing, metal films are preferably formed by plating the surfaces of the magnets 21.

According to this embodiment, the metal film 31*c* formed on the outer surface of the movable element 20 can reduce the inflow of heat caused by radiation from the structure around the linear motor to the movable element 20. Conversely, the metal film 31*a* formed on the surface of the jacket 13 of the stator 10 and the metal film 31*c* formed on the outer surface of the movable element 20 can reduce the outflow of heat caused by radiation from the stator 10 and movable element 20 to the structure around the linear motor. As a result, a position measurement error caused by deformation is decreased, so the positioning precision can be improved.

According to this embodiment, since the metal film is formed on the structure of the linear motor, operations such as assembly and adjustment become easy. Generally, in a vacuum atmosphere, in view of degassing, a water content and oil content must be avoided from attaching to the structure. Particularly, if an oil content is not removed by degreasing, it may form a soil to attach to other structures.

In this embodiment, a ceramic material is used to form the jacket 13 of the stator 10. A ceramic material is a material that is ordinarily difficult to degrease. However, since a metal film is formed on the surface of the jacket 13 by plating or the like, even if fats and fatty oils attach to it, it can be degreased easily by, e.g., wiping with alcohol. This can improve the operability.

Furthermore, according to this embodiment, since a metal film is formed on the structure of the linear motor, an antistatic effect can be expected. In particular, when a linear motor is used in an electron beam exposure apparatus, charging in the vicinity of an exposure region must be suppressed due to the nature of the electron beam. On the contrary, for example, regarding the stator, a fluorine-based inert refrigerant with high insulating properties is often used as a refrigerant for recovering heat generated by the coils 11. Hence, friction caused when the refrigerant flows in the jacket 13 tends to generate static electricity. In view of this, when a metal film is formed on the surface of the jacket 13 and is grounded to a surface plate or the like, charging of the surface of the jacket 13 can be prevented, and degradation in exposure precision of electron beam exposure can be prevented.

Although the metal films are formed in the above embodiment by plating, the present invention is not limited to them. For example, the same effect can be obtained by applying metal foils such as copper foils or aluminum foils to the respective surfaces by adhesion or the like.

Figure 2:
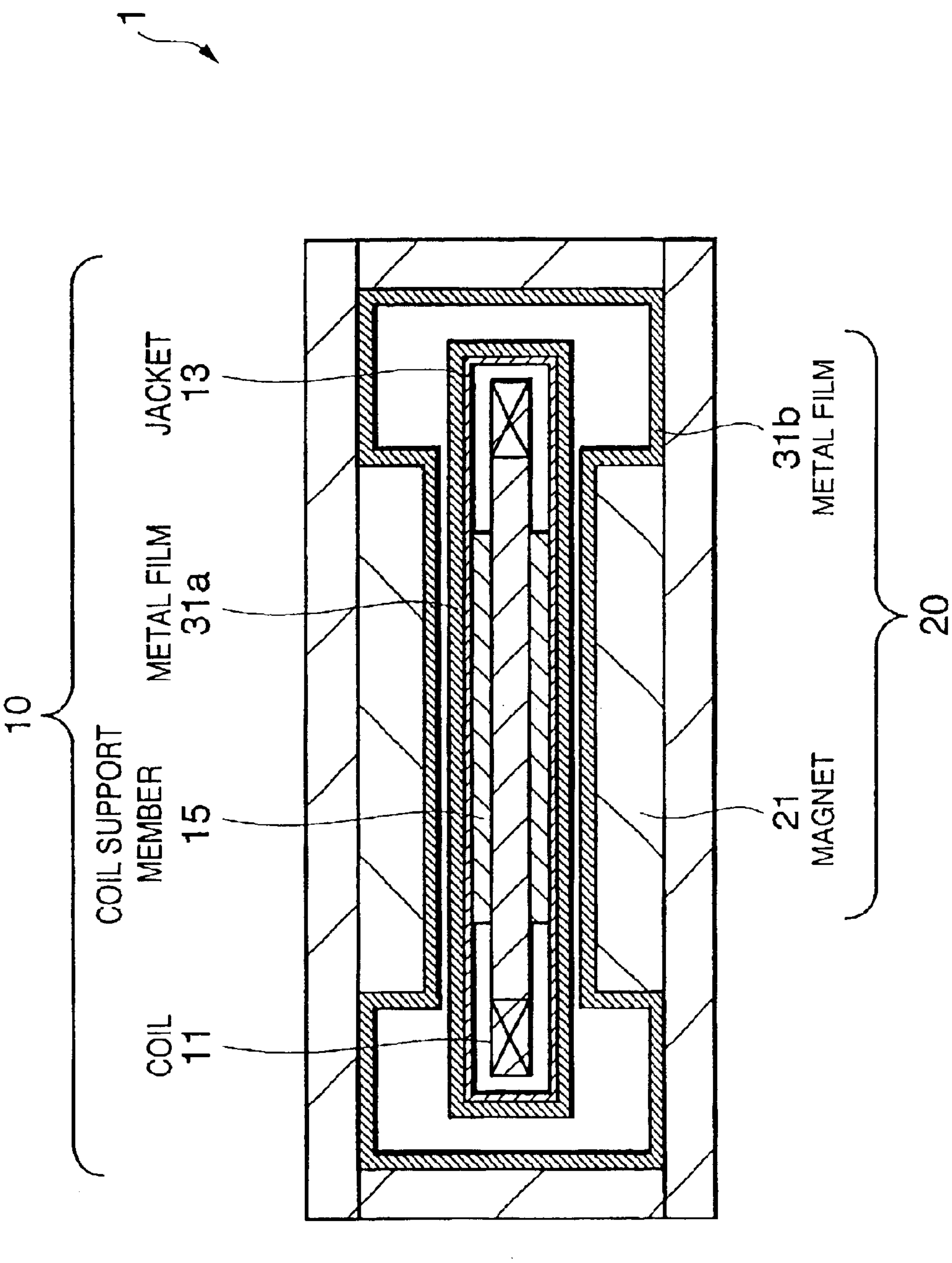
FIG. 2 is a sectional view of a linear motor according to the first modification of the first embodiment seen from its moving direction.

FIG. 2 is a sectional view of a linear motor 1 according to the first modification of the first embodiment seen from its moving direction.

This modification is different from the above embodiment in that a metal film is formed only on that portion of the surface of the movable element 20 which has a possibility of opposing the stator 10. More specifically, this modification does not have a counterpart of the metal film 31*c* formed on the outer surface of the movable element 20. This is based on the idea that, since heat flows between opposing surfaces by radiation, metal films need be formed only on opposing portions of the movable element 20 and stator 10. This modification is not limited to the arrangement of FIG. 2 as far as it can reduce the quantity of heat flowing by radiation.

Figure 3:
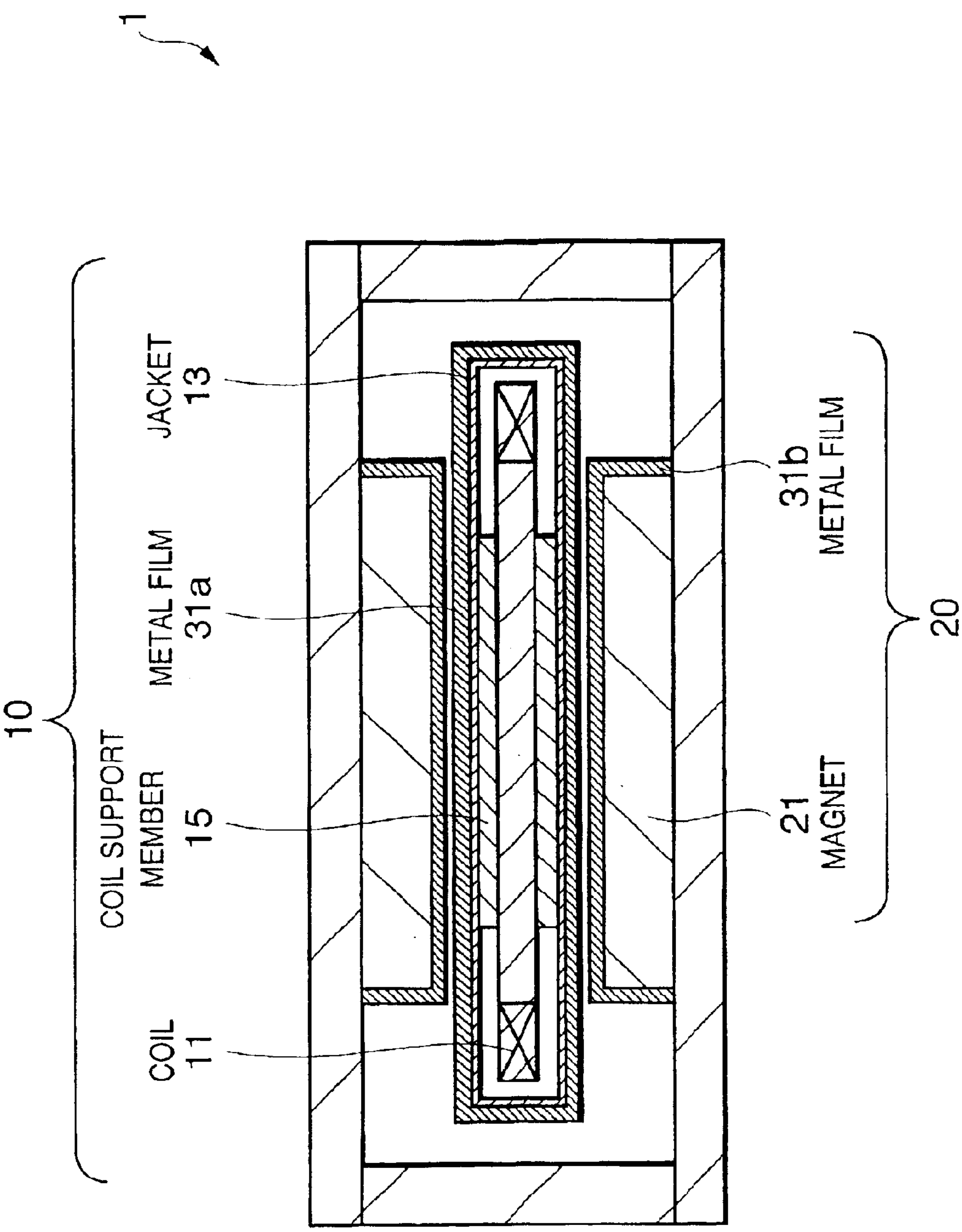
FIG. 3 is a sectional view of a linear motor according to the second modification of the first embodiment seen from its moving direction.

For example, FIG. 3 shows the second modification. According to this improvement, regarding the movable element, a metal film is formed on only its magnets. In the second modification of FIG. 2, in the movable element 20, a metal film is formed also on portions other than the magnets 21. As the material of the portions of the movable element 20 other than the magnets 21 can be selected to a certain degree and the surfaces of the portions can be polished, a metal film need not be particularly formed on these portions. Then, regarding the movable element 20, as in this embodiment, even if the metal film 31*b* is formed on only magnets that oppose the stator 10, it can decrease the quantity of heat flowing by radiation from the stator 10.

Figure 4:
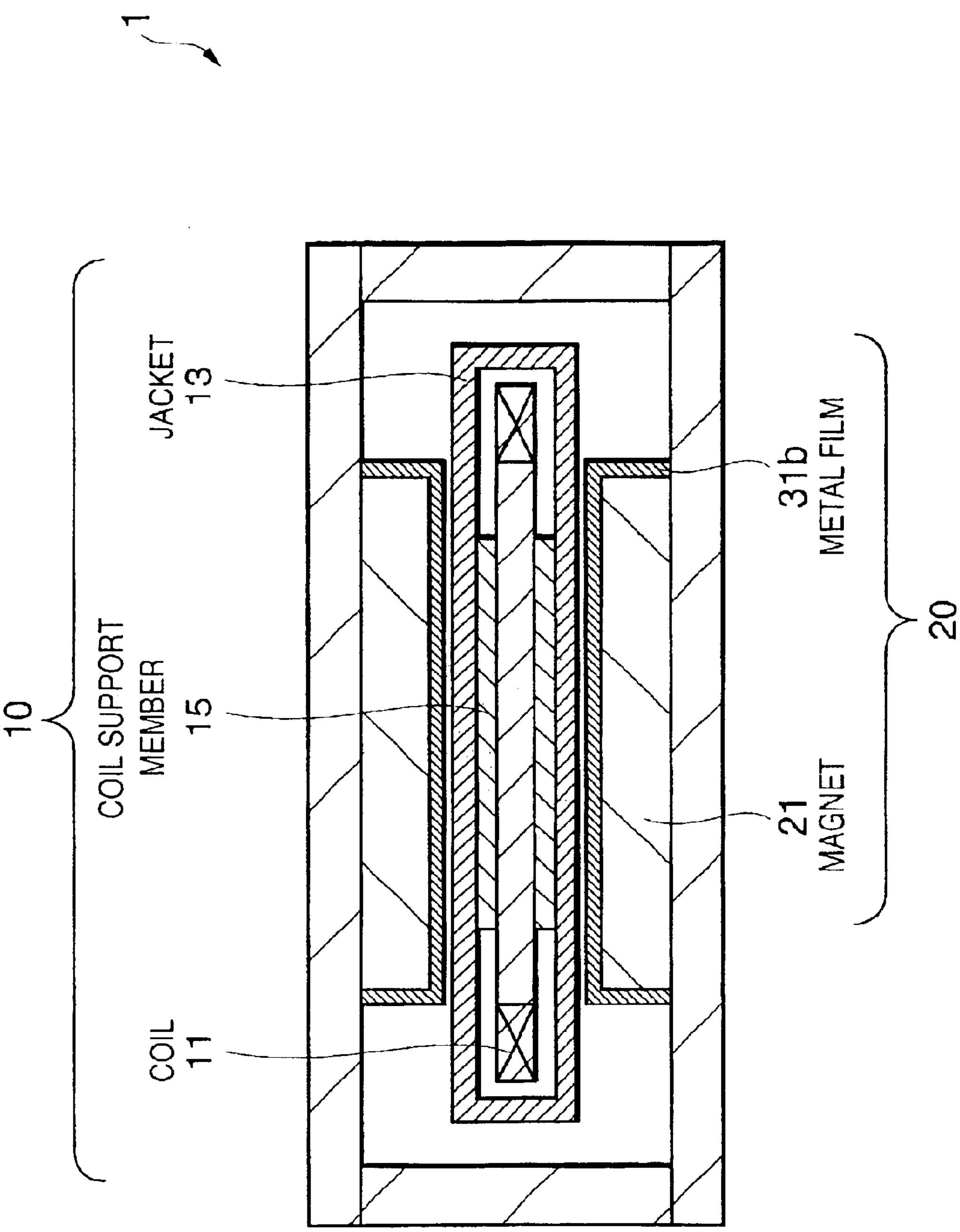
FIG. 4 is a sectional view of a linear motor according to the third modification of the first embodiment seen from its moving direction.
Figure 5:
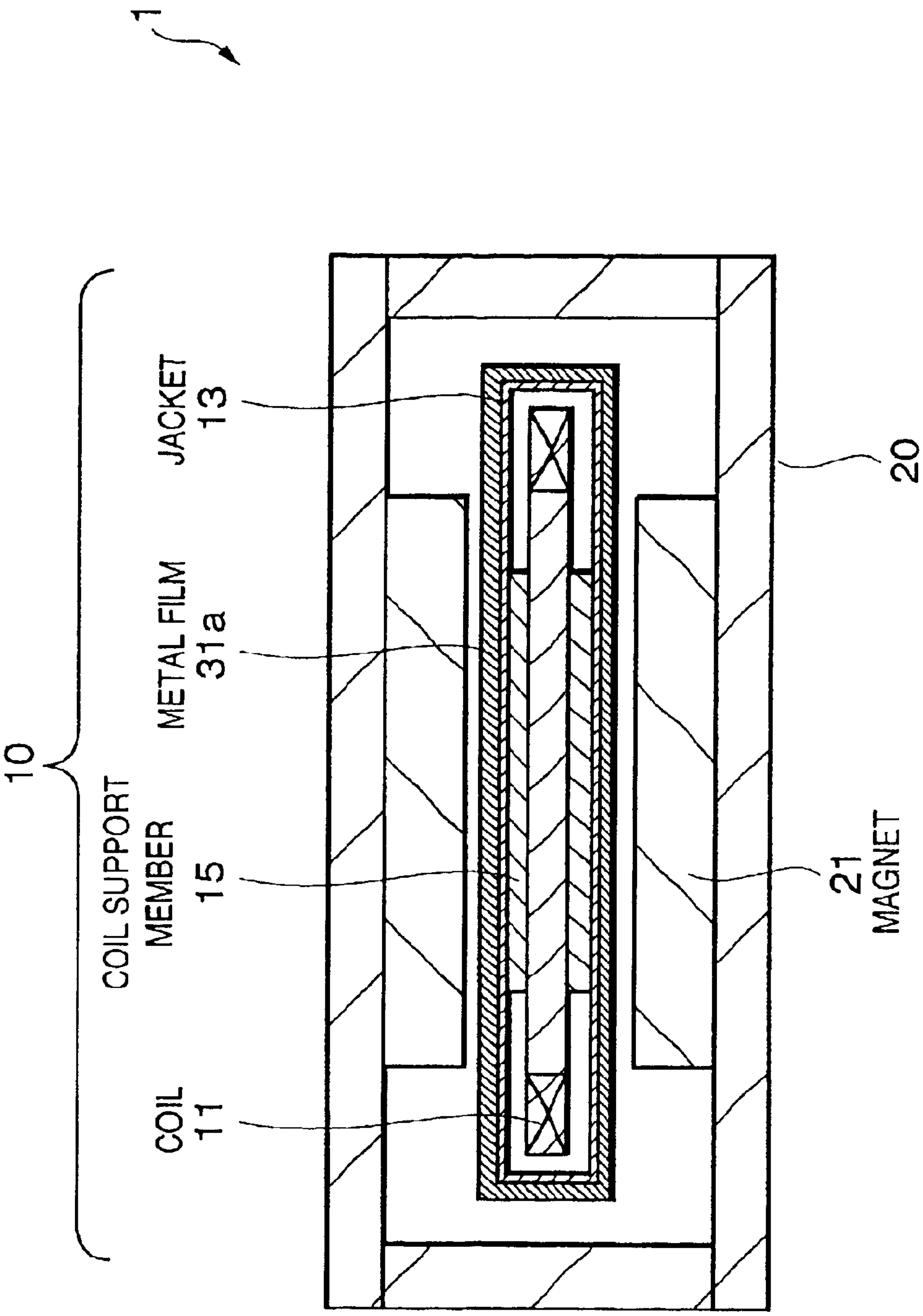
FIG. 5 is a sectional view of the linear motor according to the third modification of the first embodiment seen from its moving direction.

FIGS. 4 and 5 show the third modification. According to this modification, the metal film 31*a* or 31*b* is formed on only one of the movable element 20 and stator 10. If a metal film is formed on only one of the movable element 20 and stator 10, the flow of heat by radiation can be reduced. Naturally, if metal films are formed on both the movable element 20 and stator 10 and the emissivities of both the movable element 20 and stator 10 are reduced, flow of heat by radiation can be reduced remarkably.

[Second Embodiment]

Figure 7A:
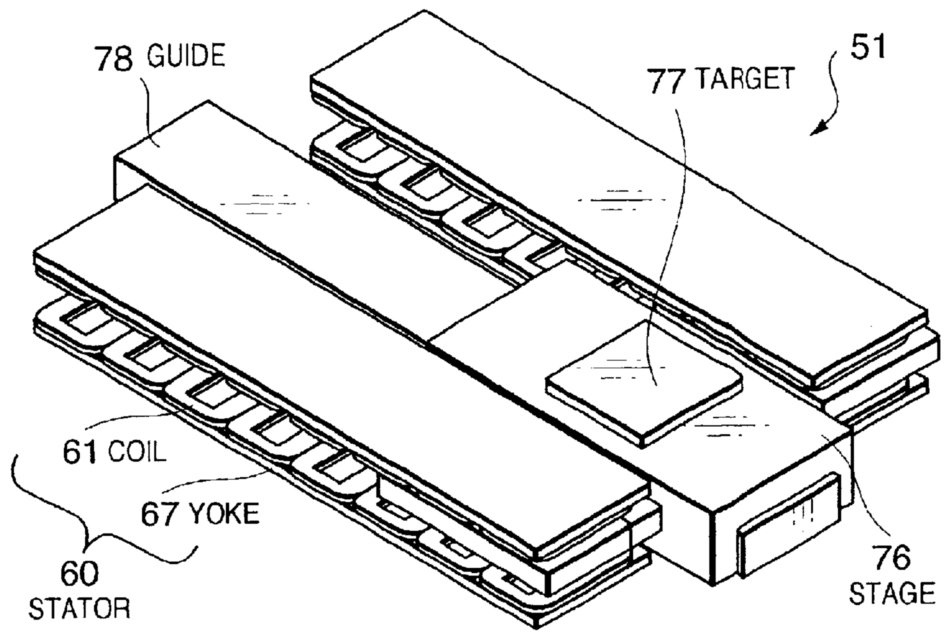
FIGS. 7A and 7B are schematic views of a linear motor according to the second embodiment.
Figure 7B:
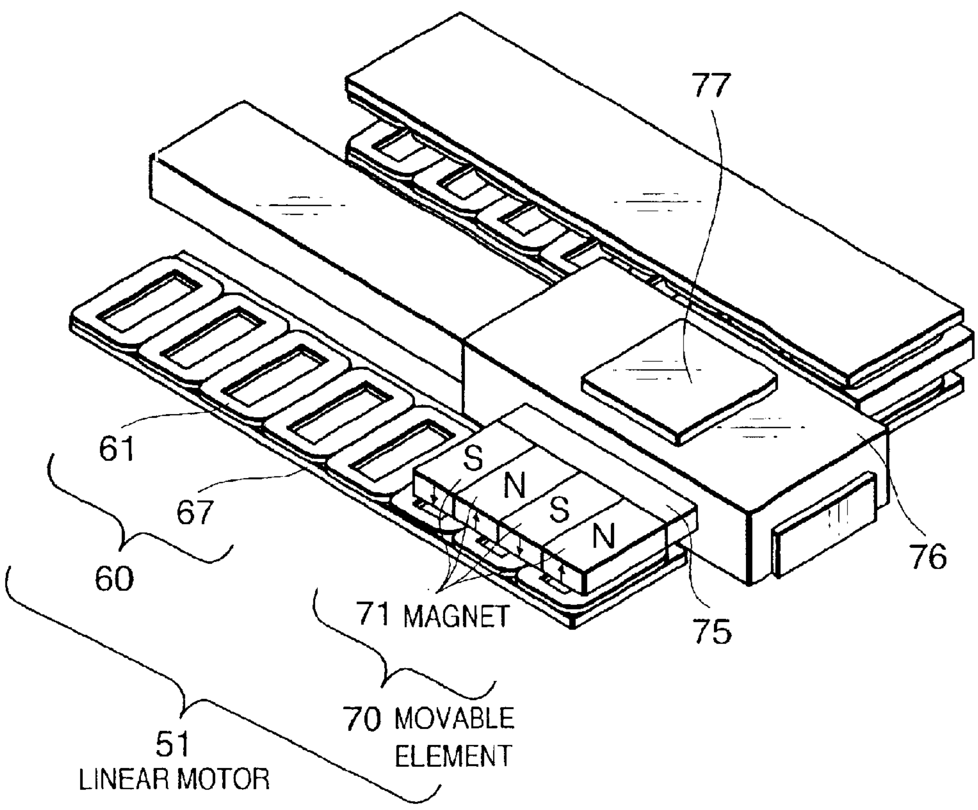

FIGS. 7A and 7B are schematic views of a linear motor according to the second embodiment.

Referring to FIGS. 7A and 7B, a linear motor 51 has a pair of stators 60 and a pair of movable elements 70. The pair of stators 60 are arranged on two sides of a guide 78. Each movable element 70 has a plurality of magnets. Each stator 60 has a plurality of coils 61 arrayed in the moving direction of the corresponding movable element 70, and a yoke 67. The coils 61 are arranged to sandwich magnets 71 of the movable elements 70. The coils 61 are fixed to the yoke 67 through a coil support member (not shown) or the like (this will be described later). The coils 61 are covered with a cooling jacket (not shown). In FIGS. 7A and 7B, this jacket is not illustrated for a descriptive convenience (this will be described later). The pair of movable elements 70 are formed integrally with a stage 76 through holding members 75. The stage 76 is supported by the guide 78 such that it is movable in the moving direction through a noncontact bearing (not shown). When a current flows to the coils 61, the Lorentz force is generated to generate a force between the movable elements 70 and stators 60. By utilizing this force, the stage 76 is positioned by the linear motor 51. A target 77 is mounted on the stage 76. Hence, the target 77 is positioned by the linear motor 51.

Figure 8:
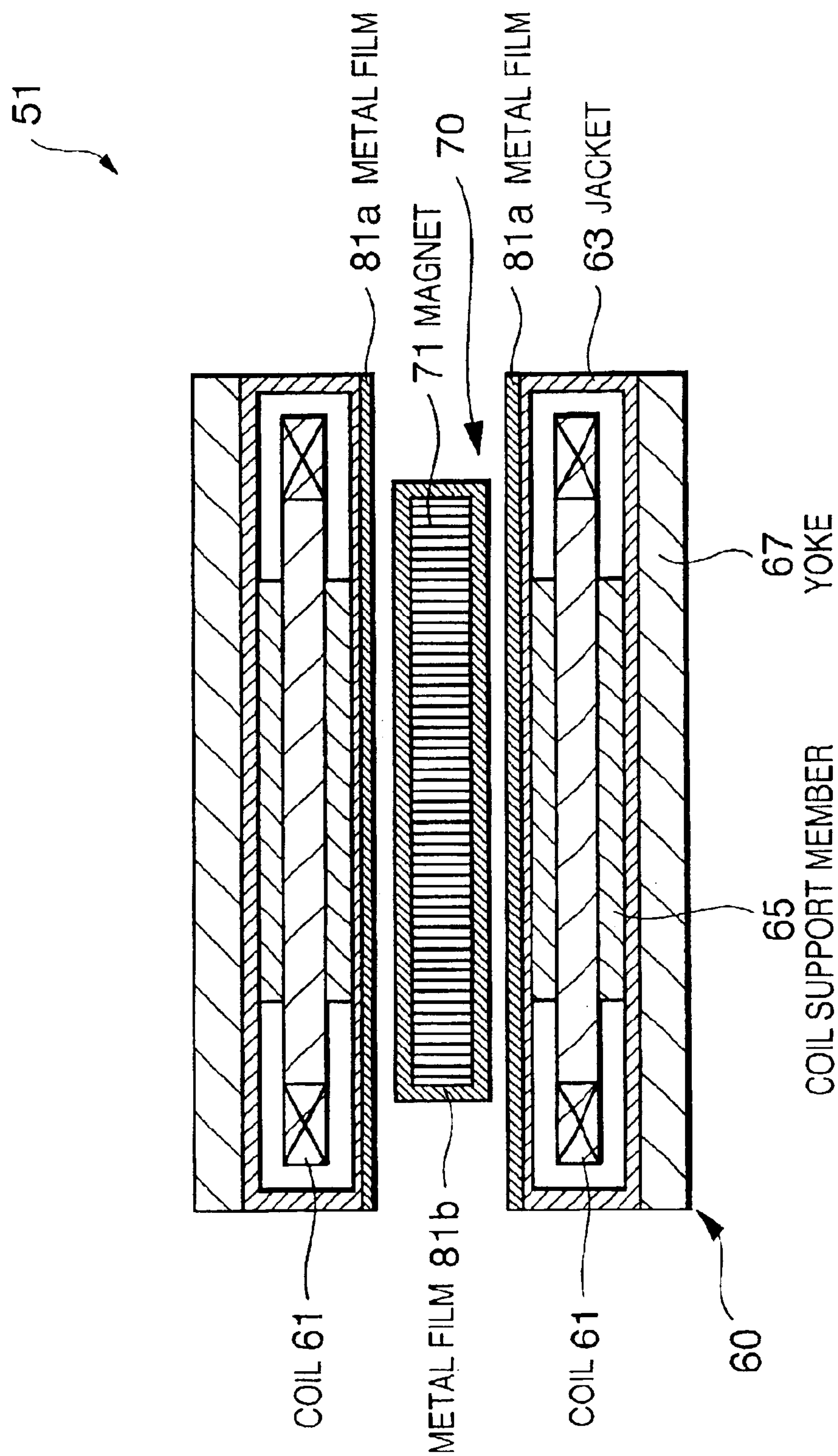
FIG. 8 is a sectional view of the linear motor according to the second embodiment seen from its moving direction.

FIG. 8 is a sectional view of one stator 60 and a corresponding movable element 70 of the linear motor 51 according to the second embodiment seen from their moving direction.

Referring to FIG. 8, the stator 60 has the plurality of coils 61 (only some of the coils are shown in FIG. 8) and jackets 63 which cover the coils 61 and in which a refrigerant is supplied to cool the coils 61. The coils 61 are held in each jacket 63 by a coil support member 65. The coil support member 65 supports the coils 61 and also serves as a jacket reinforcing member against the pressure of the refrigerant flowing inside the jacket 63. When a current flows to the coils 61, the coils 61 generate heat. The heat is recovered by the temperature-controlled refrigerant flowing inside the jacket 63. The yoke 67 is formed on one surface of the jacket 63. Namely, it can be said that the coils 61 are formed on the yoke 67 through the coil support member 65.

Each movable element 70 has the magnets 71 arranged to be sandwiched by the coils 61 of the stators 60. When the current flows to the coils 61, the Lorentz force is generated to move the movable elements 70 in a direction perpendicular to the surface of the drawing relative to the stator 10.

In this embodiment as well, metal films with small emissivities are added to the structure in order to suppress the flow of heat from the stators 60 with the coils 61 serving as a heat generating source to the movable elements 70. Reference numeral 81*a* denotes metal films formed on the surfaces of the jackets 63 of the stators 60. The metal films 81*a* are formed on at least those surfaces of the jackets 63 which oppose the magnets of the movable elements 70. Reference numeral 81*b* denotes a metal film formed on the inner surface of each movable element 70. The metal film 81*b* is formed on at least those surfaces of the magnets which oppose the coils 61. The main body of the jacket 63 of each stator 60 is made of a ceramic material.

According to this embodiment, nickel metal films formed by nickel plating are used as an example of the metal films. In the above embodiment, the metal films are subjected to mirror polishing, whereas in this embodiment, the metal films are not subjected to mirror polishing. Yet, when the metal films 81*a* are formed on the surfaces of the stators 60, the emissivities of the stators 60 can be decreased from 0.8 to 0.1. Similarly, when the metal film 81*b* is formed on the surfaces of the movable elements 70, the emissivities of the movable elements 70 can be decreased from 0.7 to about 0.2. As a result, the quantity of heat flow by radiation from the stators 60 to the movable elements 70 can be reduced. Naturally, the respective metal films may be subjected to mirror polishing.

As described above, in this embodiment as well, the nickel metal films are used. Since nickel is nonmagnetic, it does not adversely affect a magnetic circuit between the coils 61 of the stators 60 and the magnets 71 of the movable elements 70. Nickel plating can be performed at a low cost. However, the metal films are not limited to nickel films. Any other nonmagnetic material can be used to form the metal films as far as it can decrease the emissivities. Although the metal films are formed by plating, the present invention is not limited to them. For example, the same effect can be obtained by applying metal foils such as copper foils or aluminum foils to the respective surfaces by adhesion or the like.

In this embodiment as well, the thicknesses of the metal films 81*a* may be decreased to suppress an eddy current. Hence, according to this embodiment, the thicknesses of the metal films are set to 10 $\mu$m to 30 $\mu$m.

The effects obtained by this embodiment are almost the same as those of the first embodiment described above.

In the above embodiment, the metal film is formed on only one surface, the magnet side, of each jacket 63. However, the present invention is not limited to this. A metal film may naturally be formed on the entire surface of each jacket 63. Although each yoke 67 does not have a metal film, the present invention is not limited to this. A metal film may be formed on each yoke 67, as a matter of course. The surface of the main body of the yoke 67 may be subjected to mirror polishing or the like to decrease the emissivity of the yoke 67.

In the above embodiment, metal films are formed on both the stators 60 and movable elements 70. However, the present invention is not limited to this. For example, if metal films are formed on at least either the stators 60 or movable elements 70, flow of heat by radiation can be reduced. Naturally, if metal films are formed on both the stators 60 and movable elements 70 to decrease their emissivities, flow of heat by radiation can be remarkably reduced.

[Embodiment of Exposure Apparatus]

Figure 9:
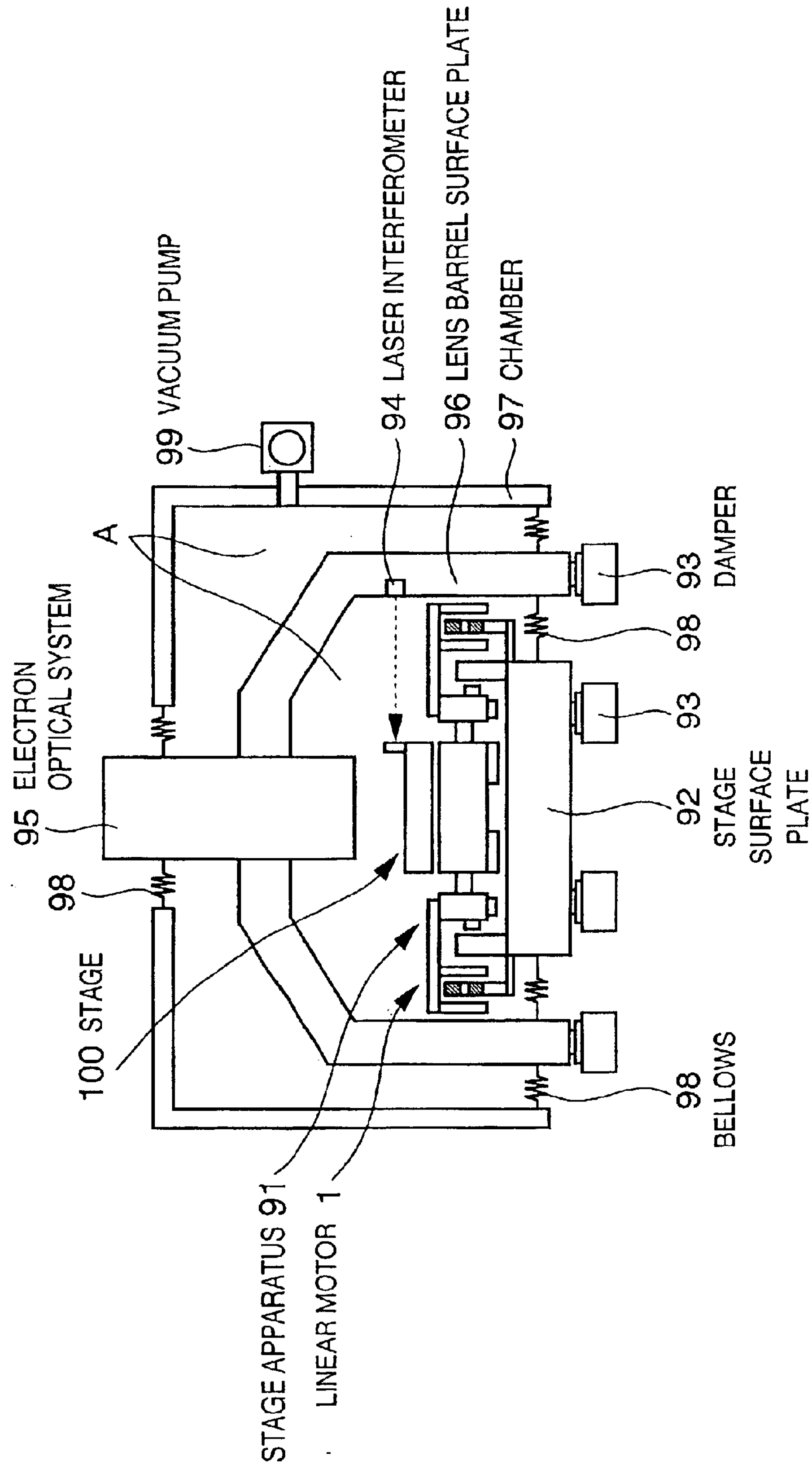
FIG. 9 is a schematic view of an embodiment of an electron beam exposure apparatus.

FIG. 9 is a schematic view of an electron beam exposure apparatus using the linear motor of the above embodiment.

Referring to FIG. 9, a stage apparatus 91 is formed by using the linear motor according to the above embodiment as a driving source for driving a stage 100. Reference numeral 92 denotes a stage surface plate for supporting the stage 100. The stage 100 is supported by the stage surface plate 92 in a noncontact manner through a bearing such as an air pad. The stage surface plate 92 is vibration-insulated from the floor by dampers 93. The dampers 93 may be passive or active. The dampers 93 have, e.g., air springs. Active dampers further have actuators. The position of the stage 100 is measured by a laser interferometer 94, and is positioned at a predetermined position on the basis of the position measurement result.

Reference numeral 95 denotes an electron optical system for the electron beam exposure apparatus. The electron optical system 95 has an electron beam radiation unit and an electron lens. The electron optical system 95 is supported by a lens barrel surface plate 96. The lens barrel surface plate 96 is supported by other dampers 93 and is vibration-insulated from the floor. The dampers 93 for supporting the lens barrel surface plate 96 may be passive or active, in the same manner as the dampers described above. The laser interferometer 94 for measuring the position of the stage 100 is arranged on the lens barrel surface plate 96. Hence, the stage 100 is positioned with reference to the lens barrel surface plate 96, i.e., the electron optical system 95, as the reference.

Reference numeral 97 denotes a chamber for hermetically sealing a predetermined region. The predetermined region will become obvious from the following description. Reference numerals 98 denote bellows for holding the hermeticity and allowing displacement of objects relative to each other. The bellows 98 are arranged between the chamber 97 and electron optical system 95, between the chamber 97 and lens barrel surface plate 96, and between the chamber 97 and stage surface plate 92. Hence, an atmosphere A in the chamber 97 is hermetically sealed. Reference numeral 99 denotes a vacuum pump. When the vacuum pump 99 is actuated, a gas in the atmosphere A in the chamber 97 is exhausted, so the atmosphere A becomes a vacuum atmosphere. The vacuum atmosphere does not require a strict vacuum but suffices as far as it is a reduced-pressure atmosphere with a sufficiently low pressure, as described above.

When the atmosphere A in the chamber 97 becomes a vacuum atmosphere because of the vacuum pump 99, a pressure difference occurs between the inside and outside of the chamber 97, and accordingly the chamber 97 deforms. The bellows 98 are formed between the chamber 97 and electron optical system 95 to allow their relative displacement while holding hermeticity. This reduces the influence of deformation of the chamber 97 from being transmitted to the electron optical system 95. Similarly, other bellows 98 are formed between the chamber 97 and lens barrel surface plate 96 to reduce the influence of deformation of the chamber 97 from being transmitted to the lens barrel surface plate 96. As a result, the influence of deformation of the chamber 97 is not transmitted to the electron optical system 95.

Because of the exposure apparatus with the above arrangement, the atmosphere around the stage apparatus 91 becomes a vacuum atmosphere. A portion around the linear motor 1 as the driving source of the stage apparatus 91 also becomes a vacuum atmosphere. When the portion around the linear motor 1 is a vacuum atmosphere, to suppress transfer of heat generated when the linear motor 1 is driven, transfer of heat by radiation may be suppressed. The electron beam exposure apparatus according to this embodiment uses, as the linear motor 1, the linear motor described in the above embodiment. Thus, transfer of heat generated by the coils to the movable elements, i.e., to the positioning portion, can be reduced. Furthermore, outflow of heat by radiation to the structure around the linear motor 1 can also be reduced. In particular, since inflow of heat by radiation to the lens barrel surface plate 96 and electron optical system 95 can be reduced, the measurement error of the laser interferometer 94 can be decreased, and the alignment precision and exposure precision can be increased.

With the electron beam exposure apparatus according to this embodiment, since the linear motor 1 described in the above embodiment is used, contamination of the atmosphere in the chamber 97 caused by degassing of the linear motor 1 can be reduced.

When the metal film on the surface of the jacket of the linear motor 1 described in the above embodiment is grounded to, e.g., the stage surface plate 92, charging of the surface of the jacket can be prevented. As a result, degradation in exposure precision of electron beam exposure can be prevented.

[Embodiment of Device Manufacturing Method]

An embodiment of a device manufacturing method utilizing the electron beam exposure apparatus described above will be explained.

Figure 10:
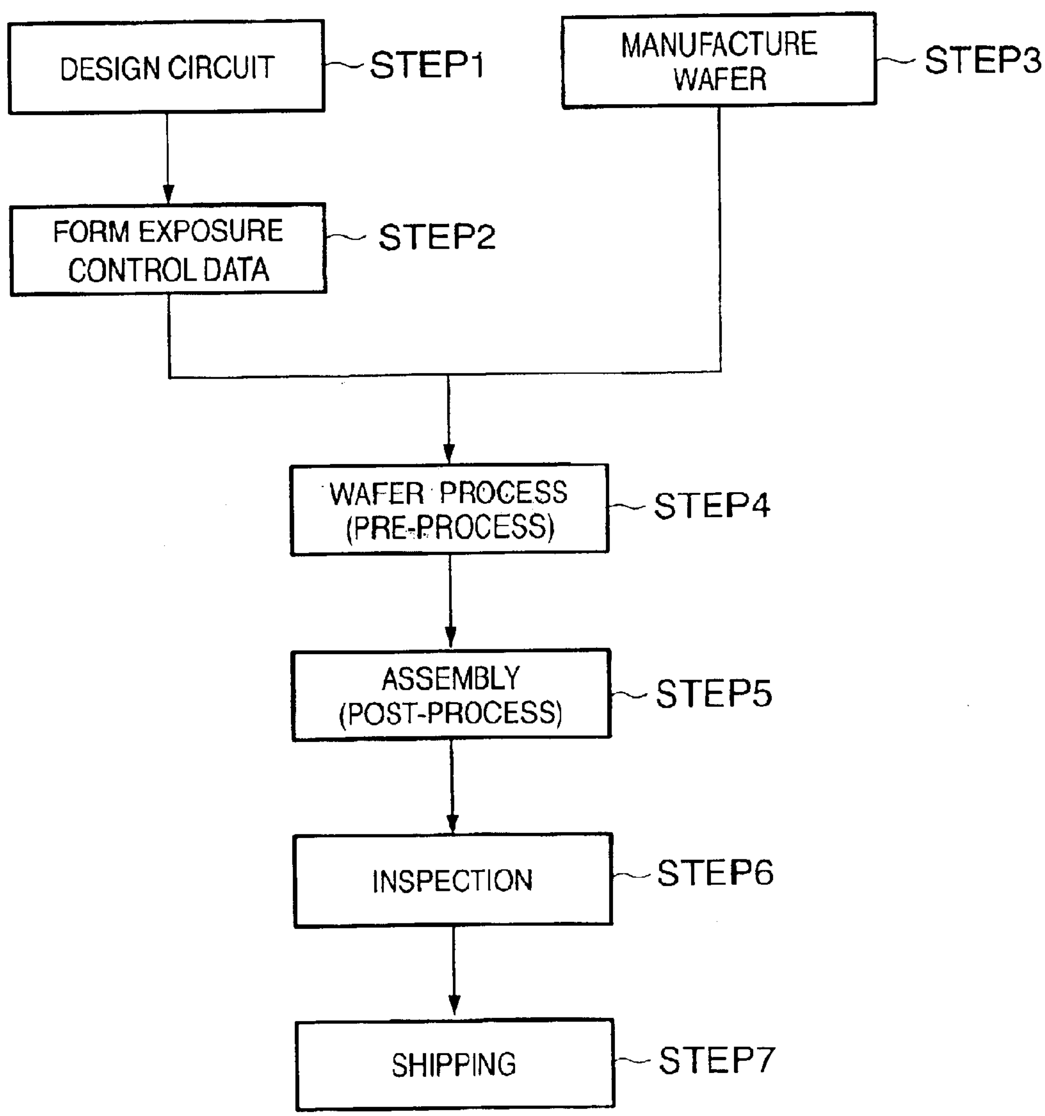
FIG. 10 is a flow chart of device manufacture.

FIG. 10 shows the flow of the manufacture of a microdevice (a semiconductor chip such as an IC or LSI, a liquid crystal panel, a CCD, a thin film magnetic head, a micromachine, and the like). In step 1 (design circuit), a semiconductor device circuit is designed. In step 2 (form exposure control data), exposure control data for the exposure apparatus is formed on the basis of the designed circuit pattern. In step 3 (manufacture wafer), a wafer is manufactured by using a material such as silicon. In step 4 (wafer process) called a pre-process, an actual circuit is formed on the wafer by lithography using the exposure apparatus to which the prepared exposure control data has been input, and the wafer. Step 5 (assembly) called a post-process is the step of forming a semiconductor chip by using the wafer manufactured in step 4, and includes an assembly process (dicing and bonding) and packaging process (chip encapsulation). In step 6 (inspection), inspections such as the operation confirmation test and durability test of the semiconductor device manufactured in step 5 are conducted. After these steps, the semiconductor device is completed and shipped (step 7).

Figure 11:
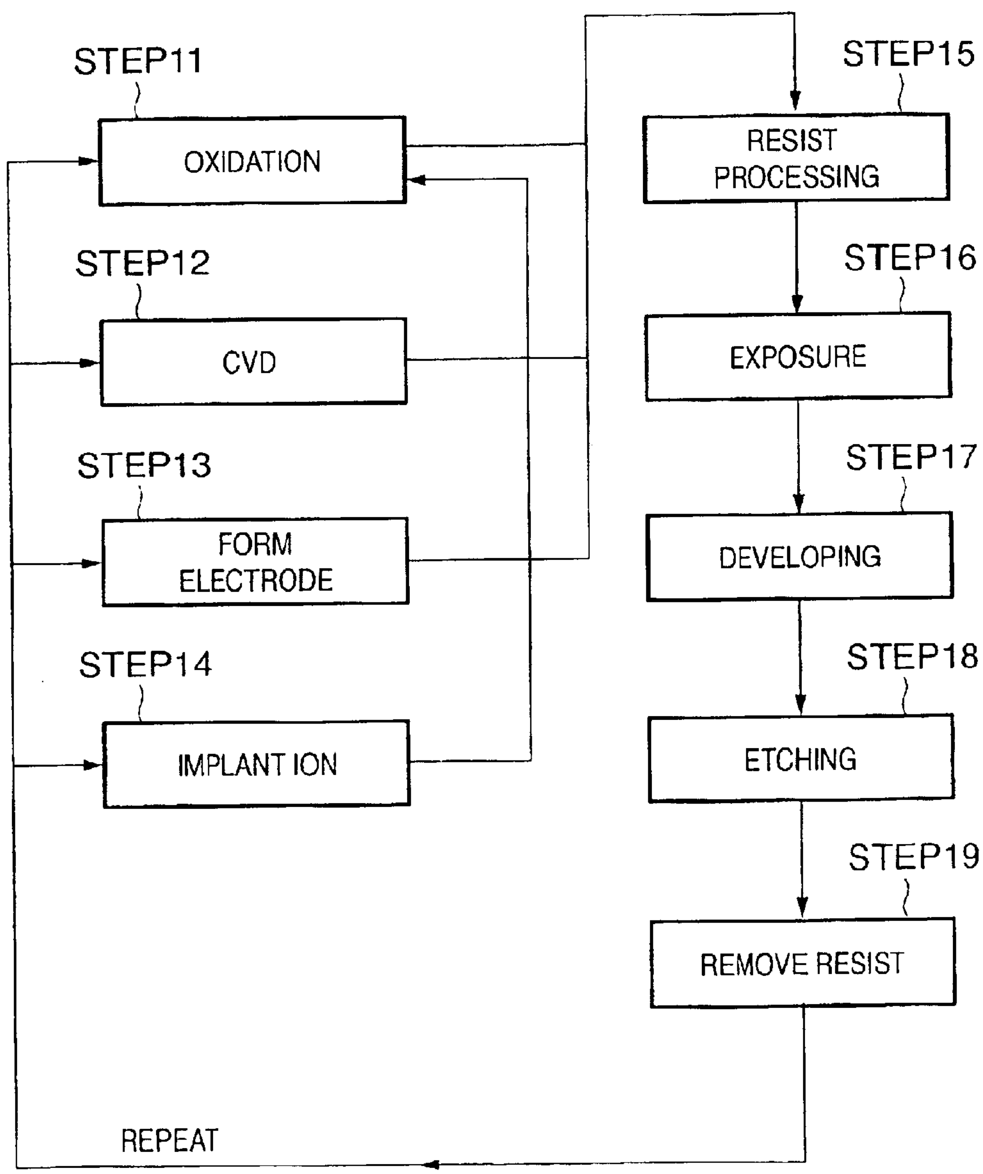
FIG. 11 is a flow chart of the wafer process.

FIG. 11 shows the detailed flow of the wafer process. In step 11 (oxidation), the wafer surface is oxidized. In step 12 (CVD), an insulating film is formed on the wafer surface. In step 13 (form electrode), an electrode is formed on the wafer by vapor deposition. In step 14 (implant ion), ions are implanted in the wafer. In step 15 (resist processing), a photosensitive agent is applied to the wafer. In step 16 (exposure), the above-mentioned exposure apparatus exposes the wafer to the circuit pattern. In step 17 (developing), the exposed wafer is developed. In step 18 (etching), the resist is etched except for the developed resist image. In step 19 (remove resist), an unnecessary resist after etching is removed. These steps are repeated to form multiple circuit patterns on the wafer.

When the manufacturing method according to this embodiment is used, a highly integrated semiconductor device which is conventionally difficult to manufacture can be manufactured with a low cost.

With the linear motor according to an aspect of the present invention, the emissivity can be decreased by forming a metal film on the surface of the linear motor, and the outflow of heat by radiation from the linear motor can be reduced.

With the linear motor according to another aspect of the present invention, the outflow of heat by radiation from a jacket that covers coils serving as a heat generating source can be prevented.

With the linear motor according to another aspect of the present invention, the flow of heat by radiation from a stator to a movable element can be reduced.

With the linear motor according to another aspect of the present invention, an eddy current generated by movement of a stator and movable element of the linear motor relative to each other can be decreased.

With the linear motor according to another aspect of the present invention, electrostatic charging can be prevented.

As many apparently widely different embodiments of the present invention can be made without departing from the spirit and scope thereof, it is to be understood that the invention is not limited to the specific embodiments thereof except as defined in the claims.

What is claimed is:

1. The linear motor comprising:

a coil;

a magnet, one of said coil and said magnet moving relative to the other of said coil and said magnet by flowing a current to said coil; and a metal film provided at least at a surface of said magnet which faces said coil, wherein said metal film contains gold.

2. The linear motor comprising:

a coil;

a magnet, one of said coil and said magnet moving relative to the other of said coil and said magnet by flowing a current to said coil; and a metal film provided at least at a surface of said magnet which faces said coil, wherein said metal film has been subjected to mirror polishing.

3. The linear motor comprising:

a coil;

a magnet, one of said coil and said magnet moving relative to the other of said coil and said magnet by flowing a current to said coil; and a metal film provided at least at a surface of said magnet which faces said coil, wherein said metal film is grounded.

4. The linear motor comprising:

a coil;

a magnet, one of said coil and said magnet moving relative to the other of said coil and said magnet by flowing a current to said coil;

a jacket covering said coil and forming a flow path through which a refrigerant flows; and a metal film provided at least at a surface of said jacket which faces said magnet, wherein said metal film comprises one of nickel and gold, and a surface of said metal film is subjected to mirror polishing.

5. The linear motor comprising:

a coil;

a magnet, one of said coil and said magnet moving relative to the other of said coil and said magnet by flowing a current to said coil; and a metal film provided at least at a surface of said magnet which faces said coil, wherein said metal film is provided at least at one of a stator and a movable element, said stator comprising said coil and said movable element comprising said magnet, and wherein said movable element comprises a support member supporting said magnet and said metal film is provided at least at a portion of said support member which faces said coil.

6. A linear motor comprising:

a coil;

a magnet, one of said coil and said magnet moving relative to the other of said coil and said magnet by flowing a current to said coil;

a support member supporting said magnet; and a metal film provided at least at one of a side of said support member which faces said coil and a side of said support member which does not face said coil.

7. A linear motor comprising:

a stator including a coil and a jacket, said jacket being arranged to cover said coil and to form a flow path through which a refrigerant flows;

a movable element comprising a magnet, said movable element moving by flowing a current to said coil; and a metal film provided at least at a surface of said jacket, wherein said metal film comprises one of nickel and gold, and a surface of said metal film is subjected to mirror polishing.

8. A linear motor comprising:

a coil;

a magnet, one of said coil and said magnet moving relative to the other of said coil and said magnet by flowing a current to said coil;

a support member supporting said magnet;

a metal surface subjected to mirror polishing and arranged in at least a potion between said coil and said support member; and a yoke supporting said coil, said metal surface being provided at said yoke.

9. The linear motor comprising:

a coil;

a magnet, one of said coil and said magnet moving relative to the other of said coil and said magnet by flowing a current to said coil;

a jacket covering said coil and forming a flow path through which a refrigerant flows; and a metal film provided at least at a surface of said jacket which faces said magnet, wherein said metal film is formed of a nonmagnetic material, and wherein said metal film contains nickel.

10. The linear motor comprising:

a coil;

a magnet, one of said coil and said magnet moving relative to the other of said coil and said magnet by flowing a current to said coil;

a jacket covering said coil and forming a flow path through which a refrigerant flows; and a metal film provided at least at a surface of said jacket which faces said magnet, wherein said metal film is formed of a nonmagnetic material, and wherein said metal film contains gold.

11. The linear motor comprising:

a coil;

a magnet, one of said coil and said magnet moving relative to the other of said coil and said magnet by flowing a current to said coil;

a jacket covering said coil and forming a flow path through which a refrigerant flows; and a metal film provided at least at a surface of said jacket which faces said magnet, wherein said metal film is formed of a nonmagnetic material, and wherein said metal film is formed by plating.

* * * * *

UNITED STATES PATENT AND TRADEMARK OFFICE

CERTIFICATE OF CORRECTION

PATENT NO. : 6,972,499 B2 
APPLICATION NO. : 10/068841
DATED : December 6, 2005
INVENTOR(S) : Keiji Emoto It is certified that error appears in the above-identified patent and that said Letters Patent is hereby corrected as shown below:

Title page,
Item [56], References Cited, FOREIGN PATENT DOCUMENTS,
"JP 302747 * of 1995....H01L/21/027" should read -- JP 7-302747 11/1995 ....H01L/21/027 --;
"JP 2001-025227 * of 2000.... H02K/41/02" should read -- JP 2001-025227 1/2001 .... H02K/41/02 --; and
"JP 2001-025227 1/2001" should be deleted.

Column 1,
Line 54, "avoided" should read -- prevented --.

Column 5,
Line 23, "far" should read -- long --.
Line 65, "avoided" should read -- prevented --.

Signed and Sealed this

Twentieth Day of June, 2006

JON W. DUDAS
*Director of the United States Patent and Trademark Office*

UNITED STATES PATENT AND TRADEMARK OFFICE

CERTIFICATE OF CORRECTION

PATENT NO. : 6,972,499 B2
APPLICATION NO. : 10/068841
DATED : December 6, 2005
INVENTOR(S) : Keiji Emoto It is certified that error appears in the above-identified patent and that said Letters Patent is hereby corrected as shown below:

<u>COVER PAGE AT ITEM [30]:</u>
Foreign Application Priority Data, "Feb. 16, 2000 (JP)" should read --Feb. 16, 2001 (JP)--.

Signed and Sealed this

Eleventh Day of July, 2006

Jon W. Dudas

JON W. DUDAS
*Director of the United States Patent and Trademark Office*